ns Patent Office
3,382,862
Patented May 14, 1968

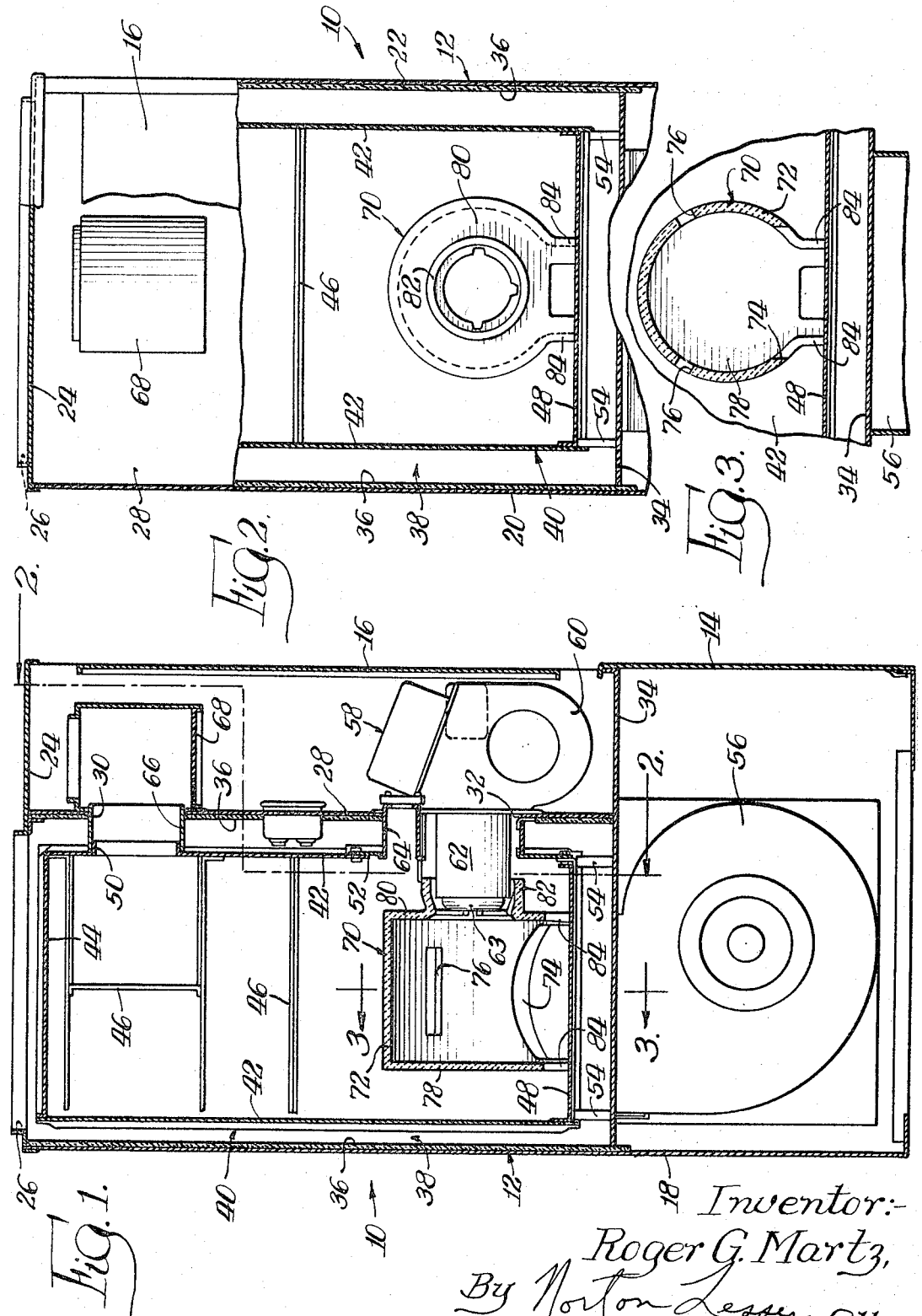

3,382,862
FURNACE CONSTRUCTION
Roger G. Martz, Lebanon, Ind., assignor to Stewart-Warner Corporation, Chicago, Ill., a corporation of Virginia
Filed Oct. 19, 1966, Ser. No. 587,858
9 Claims. (Cl. 126—110)

ABSTRACT OF THE DISCLOSURE

The following specification describes a combustion chamber having a generally cylindrical body with an inlet at one end and a closed end opposite the inlet. A downwardly directed outlet in the cylindrical wall, communicating directly with a target plate, serves to provide improved heat exchange.

---

The present invention relates generally to an oil or gas fired furnace adapted for heating commercial and residential buildings, and more particularly to a furnace construction having incorporated therein a novel form of combustion chamber.

An oil or gas fired furnace usually comprises an outer casing, a heat exchanger assembly arranged within the casing, a combustion chamber located within the confines of the heat exchanger, and a blower mounted below the heat exchanger for forcing air to be heated upwardly through the space between the casing and the heat exchanger. In the conventional furnace, a combustible fuel is ignited by a burner unit and directed into the combustion chamber where an exothermic reaction occurs resulting in the production of hot combustion gases. These gases are then directed outwardly through a top opening in the combustion chamber and upwardly along the walls of the heat exchanger assembly interiorly thereof. With this arrangement, the area surrounding the bottom portion of the combustion chamber adjacent the lower end of the heat exchanger assembly remain relatively cool. As a consequence, only a small amount of heat is transferred to the forced air as it moves across the lower end of the heat exchanger, the overall efficiency of the furnace is thereby adversely affected, and an unnecessarily large heat exchanger is required.

It is an object of the present invention to provide a furnace construction in which heat of combustion is directed to all portions of the heat exchanger whereby optimum heat transfer is effected throughout the heat exchanger and a significant reduction in the overall dimensions of the heat exchanger is permitted.

It is another object of the present invention to provide a furnace construction incorporating a novel form of combustion chamber which serves to direct heat of combustion downwardly to the bottom wall of the heat exchanger whereby to establish substantial heat transfer at the lower end of the heat exchanger.

It is a further object of the present invention to provide a combustion chamber wherein conversion of burning fuel to usable heat is materially improved.

Now in order to acquaint those skilled in the art with the manner of constructing and using furnace constructions in accordance with the principles of the present invention, there will be described in connection with the accompanying drawing a preferred embodiment of the invention.

In the drawing:

FIGURE 1 is a vertical sectional view of a furnace incorporating the principles of the present invention;

FIGURE 2 is a partial sectional view of the furnace of FIGURE 1, taken substantially along the line 2—2 in FIGURE 1, looking in the direction indicated by the arrows; and FIGURE 3 is a sectional view of the combustion chamber of the furnace of FIGURE 1, taken substantially along the line 3—3 in FIGURE 1, looking in the direction indicated by the arrows.

Referring now to the drawing, there is indicated generally by the reference numeral 10 a furnace adapted for heating commercial and residential buildings. The furnace 10 includes an outer casing or housing 12 which is comprised of a lower front wall 14, an upper removable front closure panel 16, a rear wall 18, side walls 20 and 22, a top wall 24 formed with a hot air discharge outlet 26, an intermediate vertical wall 28 provided with upper and lower openings 30 and 32, and an intermediate horizontal wall 34. The vertical wall 28, rear wall 18 and side walls 20 and 22 are interiorly lined with insulation 36, and serve to define a heat transfer compartment 38 above the horizontal wall 34.

Arranged within the heat transfer compartment 38 is a generally rectangular upright heat exchanger assembly 40 comprised of four vertically disposed side walls 42, a top wall 44, intermediate baffle plates 46, and a bottom wall or target plate 48. The side walls 42 are spaced inwardly of the adjacent walls of the casing 12, and the side wall 42 facing the intermediate vertical casing wall 28 is provided with upper and lower openings 50 and 52. The heat exchanger assembly 40 is supported on the intermediate horizontal casing wall 34 by means of leg or bracket members 54.

A blower unit 56, which is suspended from the intermediate horizontal casing wall 34, serves to impel air to be heated through the heat transfer compartment 38 about the heat exchanger assembly 40 and out through the hot air discharge outlet 26. A conventional fuel burner assembly 58 is mounted on the outboard side of the intermediate vertical casing wall 28. The fuel burner assembly 58 includes a housing 60 in which are located a fuel pump and a combustion air fan, and a generally cylindrical burner tube 62 that projects through the lower opening 32 in the intermediate vertical casing wall 28 and the lower opening 52 in the side wall of heat exchanger assembly 40. The burner tube 62 has an air cone 63 at its outer end and is surrounded by a shroud assembly 64 that extends between the openings 32 and 52. A hot gas discharge conduit 66 extends between the upper opening 50 in the heat exchanger assembly 40 and the upper opening 30 in the intermediate vertical casing wall 28, and communicates with a flue connector 68.

Located within the heat exchanger assembly 40 immediately above the target plate 48 is a combustion chamber 70 which serves to accommodate therein an exothermic reaction of ignited fuel. The combustion chamber 70, which is preferably fabricated of a ceramic material, comprises a generally cylindrical horizontal body portion 72 having an opening 74 formed in the bottom thereof that defines primary outlet means. The cylindrical body portion 72 also has formed therein lengthwise elongated apertures 76 which are circumferentially spaced from the bottom opening 74 and which define secondary outlet means. The combustion chamber 70 is further comprised of a closed end wall portion 78, an end wall portion 80 formed with an annular projection 82, and downwardly projecting foot portions 84 that are supported on the target plate 48 and serve to space the bottom opening 74 from the latter. The annular projection 82, which communicates interiorly of the combustion chamber 70, receives the outer end of the burner tube 62.

In the operation of the furnace 10, a combustible fuel, such as heating oil No. 3, Commercial Standard CS–12 Grade, is partially mixed with air and ignited in the burner tube 62. The ignited fuel in admixture with the air passes through the air cone 63 and into the center of the combustion chamber 70 to effect an exothermic reaction within the chamber in a conventional manner. The flame of the burning fuel radiates, and accompanying hot combustion gases are directed, downwardly through the bottom chamber opening 74 against the top side of the target plate 48. This resultant heat of combustion is immediately transferred by conduction through the target plate 48 to the air moving from the blower unit 56 across the underside of the target plate. Also, heat, including hot combustion gases, are deflected by the target plate 48 upwardly along the side walls 42 of the heat exchanger assembly 40. At the same time, the flame of the burning fuel radiates, and accompanying hot combustion gases are directed, diagonally upwardly through the chamber apertures 76 along the heat exchanger side walls 42. By reason of the described furnace construction, air delivered by the blower unit 56 is heated both by the target plate 48 and by the entire side walls 42 of the heat exchanger assembly 40. The air that is heated while it passes through the heat transfer compartment 38 about the heat exchanger assembly 40 is discharged through the outlet 26. The hot combustion gases flow upwardly around the heat exchanger baffle plates 46 and outwardly through the hot gas discharge conduit 66 and the flue connector 68. The combustion chamber of the present invention effects improved conversion of burning fuel usable heat, and the combined arrangement of the combustion chamber and the heat exchanger assembly effects improved heat transfer between the heat source and the air to be heated. These features contribute to optimum efficiency and overall compactness of the furnace.

While there has been shown and described a preferred embodiment of the present invention, it will be understood by those skilled in the art that various rearrangements and modifications may be made therein without departing from the spirit and scope of the invention.

I claim:

1. In a furnace, the combination of a heat exchanger assembly having generally vertically disposed side walls, a target plate extending between said side walls of said heat exchanger adjacent the lower end thereof, a combustion chamber located immediately above said target plate and having inlet means for receiving ignited fuel, said combustion chamber serving to accommodate therein an exothermic reaction of ignited fuel, said combustion chamber having a closed end wall portion located opposite said inlet means with top and side wall portions therebetween for confining heat flow in respective directions and primary outlet means between said end wall portion and said inlet means through which heat is directed downwardly against said target plate, and said target plate serving both to conduct heat therethrough and to deflect heat upwardly along said side walls of said heat exchanger assembly.

2. In a furnace, the combination of a heat exchanger assembly having generally vertically disposed side walls, a target plate extending between said side walls of said heat exchanger adjacent the lower end thereof, a combustion chamber located immediately above said target plate and having inlet means for receiving ignited fuel, said combustion chamber serving to accommodate therein an exothermic reaction of ignited fuel, said combustion chamber having primarily outlet means through which heat is directed downwardly against said target plate with said target plate serving both to conduct heat therethrough and to deflect heat upwardly along said side walls of said heat exchanger assembly, and said combustion chamber includes secondary outlet means through which heat is directed diagonally upwardly along said side walls of said heat exchanger assembly.

3. In a furnace, the combination of a heat exchanger assembly having generally vertically disposed side walls, a target plate extending between said side walls of said heat exchanger adjacent the lower end thereof, a combustion chamber located immediately above said target plate and having inlet means for receiving ignited fuel, said combustion chamber serving to accommodate therein an exothermic reaction of ignited fuel, said combustion chamber having a generally cylindrical horizontal body portion with a bottom opening defining primary outlet means through which heat is directed downwardly against said target plate, and said target plate serves both to conduct heat therethrough and to deflect heat upwardly along said side walls of said heat exchanger assembly with said cylindrical body portion having formed therein lengthwise elongated apertures which are circumferentially spaced from said bottom opening and which define secondary outlet means through which heat is directed diagonally upwardly along said side walls of said heat exchanger assembly.

4. The combination of claim 3 wherein said combustion chamber at one end thereof has a closed wall portion and at the other end thereof has a wall portion with an annular projection which communicates interiorly of said body portion and defines said inlet means.

5. The combination of claim 4 wherein said combustion chamber is supported on said target plate by means of downwardly projecting foot portions that serve to space said bottom opening from said target plate.

6. A combustion chamber comprising a generally cylindrical horizontally disposed body portion with an inlet opening at one end of said cylindrical body and a closed end opposite said inlet end to confine the heat generated in said combustion chamber and having a bottom opening in said cylindrical body portion that defines primary outlet means for directing heat against a target plate directly below said primary outlet means.

7. A combustion chamber comprising a generally cylindrical horizontally disposed body portion having a bottom opening that defines primary outlet means, and said cylindrical body portion has formed therein lengthwise elongated apertures which are circumferentially spaced from said bottom opening and which define secondary outlet means.

8. The combustion chamber of claim 7 wherein said combustion chamber at one end thereof has a closed wall portion and at the other end thereof has a wall portion with an annular projection which communicates interiorly of said body portion and defines inlet means.

9. The combustion chamber of claim 8 including supporting foot portions projecting downwardly from said body portion and having their lower ends lying in a common plane spaced below said bottom opening.

References Cited

UNITED STATES PATENTS

| | | | |
|---|---|---|---|
| 2,789,520 | 4/1957 | Rowland | 158—4 X |
| 2,808,046 | 10/1957 | Jaye | 158—4 X |
| 3,185,200 | 6/1965 | Sherman | 158—1 |

FREDERICK L. MATTESON, JR., *Primary Examiner.*

E. G. FAVORS, *Assistant Examiner.*